US008781238B2

(12) United States Patent
Ninan et al.

(10) Patent No.: US 8,781,238 B2
(45) Date of Patent: Jul. 15, 2014

(54) EFFICIENT DECODING AND POST-PROCESSING OF HIGH DYNAMIC RANGE IMAGES

(75) Inventors: Ajit Ninan, San Jose, CA (US); Arkady Ten, Sunnyvale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 163 days.

(21) Appl. No.: 13/605,368

(22) Filed: Sep. 6, 2012

(65) Prior Publication Data

US 2013/0064462 A1 Mar. 14, 2013

Related U.S. Application Data

(60) Provisional application No. 61/532,413, filed on Sep. 8, 2011.

(51) Int. Cl.
*G06K 9/36* (2006.01)
*H04N 7/30* (2006.01)
*H04N 7/26* (2006.01)

(52) U.S. Cl.
CPC ... *H04N 19/00533* (2013.01); *H04N 19/00775* (2013.01); *H04N 19/00545* (2013.01); *H04N 19/00903* (2013.01)
USPC ......................................................... 382/233

(58) Field of Classification Search
None
See application file for complete search history.

(56) References Cited

U.S. PATENT DOCUMENTS

| | | | |
|---|---|---|---|
| 6,563,954 B2 * | 5/2003 | Tan ............................. | 382/233 |
| 6,943,831 B2 | 9/2005 | Gallagher | |
| 7,366,354 B2 | 4/2008 | Schweid | |
| 7,492,375 B2 * | 2/2009 | Toyama et al. ............... | 345/629 |
| 7,747,098 B2 | 6/2010 | Ward | |
| 7,826,673 B2 | 11/2010 | Segall | |
| 8,111,941 B2 * | 2/2012 | Kokemohr .................... | 382/274 |
| 8,218,625 B2 * | 7/2012 | Ward et al. ............... | 375/240.03 |
| 8,228,417 B1 * | 7/2012 | Georgiev et al. ............. | 348/340 |
| 8,514,934 B2 * | 8/2013 | Ward et al. ............... | 375/240.03 |
| 2004/0120587 A1 * | 6/2004 | Chang et al. .................. | 382/233 |
| 2005/0047667 A1 * | 3/2005 | Ju ................................. | 382/233 |
| 2006/0197777 A1 | 9/2006 | Cha | |
| 2007/0076971 A1 * | 4/2007 | Roimela et al. ............... | 382/251 |
| 2008/0131016 A1 | 6/2008 | Kokemohr | |
| 2008/0192819 A1 * | 8/2008 | Ward et al. ............... | 375/240.02 |
| 2008/0198935 A1 | 8/2008 | Srinivasan | |

(Continued)

OTHER PUBLICATIONS

Dugad, R. et al. "A Fast Scheme for Image Size Change in the Compressed Domain" IEEE Transactions on Circuits and Systems for Video Technology, vol. 11, No. 4, Apr. 2001, pp. 461-474.

(Continued)

*Primary Examiner* — Bhavesh Mehta
*Assistant Examiner* — Feng Niu
(74) *Attorney, Agent, or Firm* — Konstantinos Konstantinides

(57) ABSTRACT

A decoder receives for decoding and post-processing for display an HDR (high dynamic range) image comprising a first coded image (e.g., a JPEG-HDR baseline image) and a second coded image (e.g., a JPEG-HDR ratio image). The first coded image is partially decoded and post-processed according to a post-processing command (e.g., scaling) to output a first decoded and post-processed image. The second coded image is also partially decoded and post-processed according to the post-processing command to output a second decoded and post-processed image. The first and the second decoded and post-processed images are combined to output a decoded HDR image according to the post-processing command.

14 Claims, 2 Drawing Sheets

(56) References Cited

U.S. PATENT DOCUMENTS

| | | |
|---|---|---|
| 2008/0215240 A1* | 9/2008 | Howard et al. ............... 701/213 |
| 2008/0310501 A1* | 12/2008 | Ward et al. ............... 375/240.02 |
| 2009/0097549 A1 | 4/2009 | Kim |
| 2009/0304273 A1* | 12/2009 | Fukuhara ....................... 382/166 |
| 2009/0317012 A1* | 12/2009 | Yang et al. .................... 382/245 |
| 2010/0046612 A1 | 2/2010 | Sun |
| 2010/0091981 A1* | 4/2010 | Shi et al. .......................... 380/28 |
| 2012/0002899 A1* | 1/2012 | Orr et al. ........................ 382/282 |

OTHER PUBLICATIONS

Ward, G. et al. "JPEG-HDR: A Backwards-Compatible, High Dynamic Range Extension to JPEG" published in Thirteenth Color Imaging Conference: Color Science and Engineering Systems, Technologies and Applications, Nov. 2005, pp. 283-290, Scottsdale, Arizona.

* cited by examiner

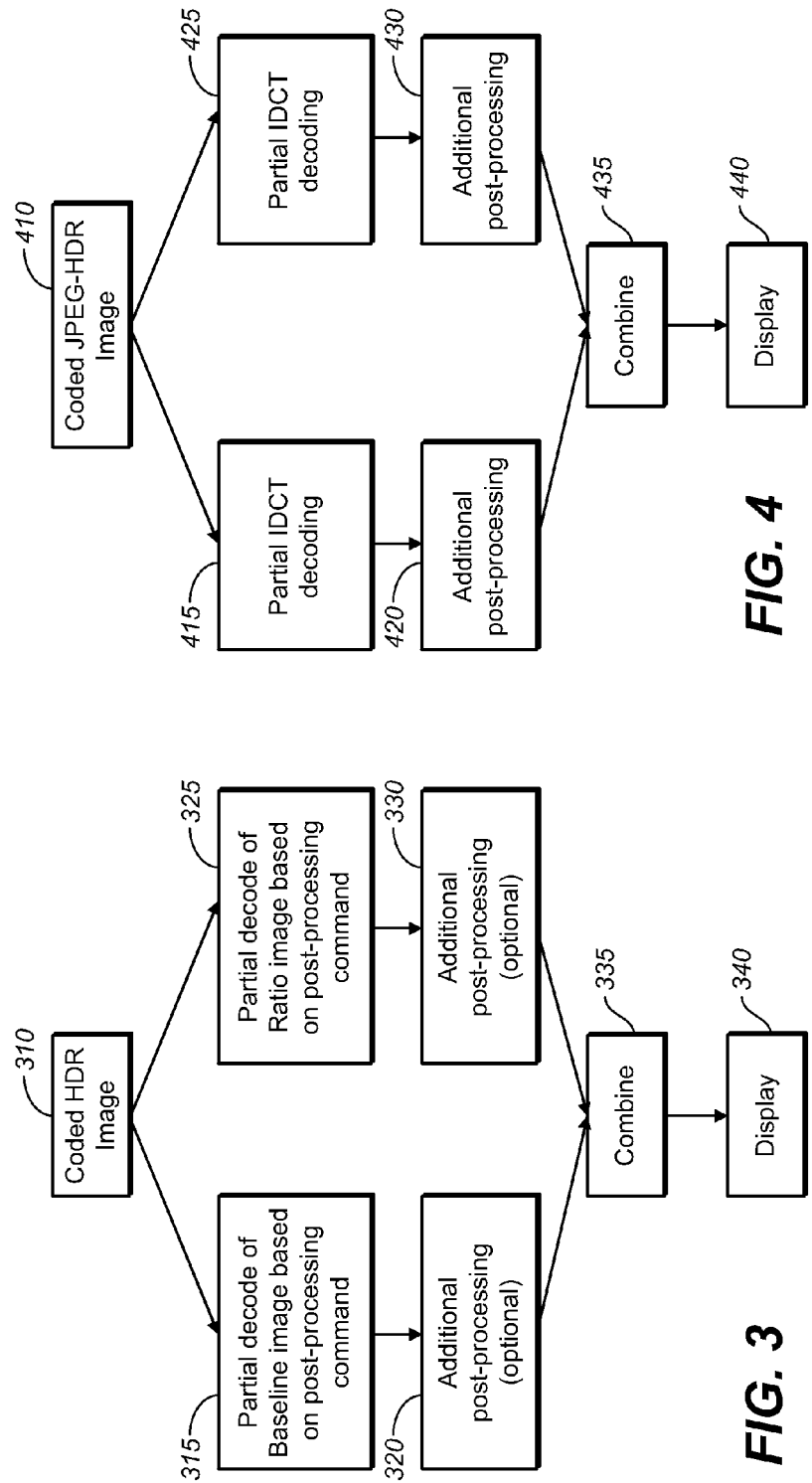

US 8,781,238 B2

EFFICIENT DECODING AND POST-PROCESSING OF HIGH DYNAMIC RANGE IMAGES

CROSS-REFERENCE TO RELATED APPLICATIONS

This application claims priority to U.S. Provisional Application No. 61/532,413, filed Sep. 8, 2011, hereby incorporated by reference in its entirety.

TECHNOLOGY

The present invention relates generally to images. More particularly, an embodiment of the present invention relates to the efficient decoding and post-processing of high dynamic range images.

BACKGROUND

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or opthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

Until fairly recently, displays have had a significantly narrower DR than HDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to HDR.

To support backwards compatibility as well as new HDR display technologies, an HDR image may be represented by a tone-mapped image (typically referred to as the baseline image) with additional metadata comprising grayscale luminance ratios (typically, referred to as a ratio image). On one hand, the tone-mapped image may be used to provide support for standard dynamic range imaging workflows (e.g., displaying images on SDR imaging devices). On the other hand, the additional metadata (e.g., the ratio image) may be used with the tone-mapped image to generate, recover, or present an HDR image (e.g., by an HDR display).

As used herein, the terms "up-sampling" or "up-scaling" relate to the process of transforming one or more color components of an image from one spatial resolution to a second, higher, spatial resolution. For example, an image may be up-sampled from a 720×480 spatial resolution to a 1280×720 spatial resolution.

As used herein, the terms "down-sampling" or "down-scaling" relate to the process of transforming one or more color components of an image from one spatial resolution to a second, lower, spatial resolution. For example, an image may be down-sampled from a 1280×720 spatial resolution to a 720×480 spatial resolution.

As used herein, the term "windowing" relates to the process of selecting and displaying an area of the image that is smaller than the total area of the image. For example, if the original image has a spatial resolution of 1280×720 pixels, a window operation may select to display only portion of that image, e.g., an area of 720×480 pixels with origin the top, left-most pixel, of the image.

Given a coded image comprising multiple coded regions, the terms "partial decoding" or "decoding in part" relate to a decoding process where only part of the coded image is decoded, either in the spatial domain or a transform domain. For example, given a JPEG image which is coded using a plurality of 8×8 blocks of DCT (Discrete Cosine Transform) coefficients, partial decoding in the transform domain may be performed by decoding each coded block using an N×N inverse DCT, where N is an integer and $1 \leq N < 8$. Similarly, partial decoding in the spatial domain may be performed by decoding only a sub-set of the total number of 8×8 blocks in the coded image.

Mobile devices, such as smart phones or electronics tablets, have typical screen resolutions that are much smaller than the native resolution of captured SDR or HDR images. In most cases, before displaying a high-resolution image on such a device, after decoding, the image is post-processed by such operations as windowing, scaling, and cropping. Under existing techniques, these operations may require extensive memory and computational resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 3 depicts an example processing flow for HDR image decoding and post-processing according to an embodiment of the present invention; and FIG. 4 depicts an example processing flow for JPEG-HDR image decoding and post-processing according to an embodiment of the present invention.

DESCRIPTION OF EXAMPLE EMBODIMENTS

Efficient decoding and image post-processing of high dynamic range (HDR) images is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the efficient decoding, image post-processing, and display of HDR images. Example image post-processing operations include up-scaling, down-scaling, and windowing of an HDR image. A decoder receives for decoding and post-processing for display an HDR (high dynamic range) image comprising a first coded image (e.g., a JPEG-HDR baseline image) and a second coded image (e.g., a JPEG-HDR ratio image). The first coded image is partially decoded and post-processed according to a post-processing command (e.g., scaling or windowing) to output a first decoded and post-processed image. The second coded image is also partially decoded and post-processed according to the post-processing command to output a second decoded and post-processed image. The first and the second decoded and post-processed images are combined to output a decoded HDR image according to the post-processing command.

Example HDR Image Processing System

Figure 1:
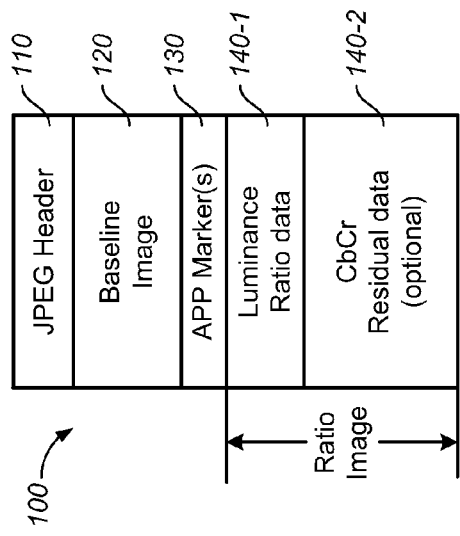
FIG. 1 depicts an example file structure of an HDR image stored in the JPEG-HDR format.

FIG. 1 depicts an example file structure of an HDR image encoded in what will be referred herein as the JPEG-HDR image format. The JPEG-HDR format, originally described in "G. Ward and M. Simmons, *JPEG-HDR: a backwards-compatible, high dynamic range extension to JPEG*, Proc. of the thirteenth Color Imaging conference, pp. 283-290," uses a standard JFIF (JPEG File Interchange Format) file wrapper to encapsulate two images: a JPEG-compressed tone-mapped version of the original HDR image, referred to herein as the baseline image, and a compressed ratio image. A standard JPEG image decoder may decode only the baseline image and ignore the data related to the ratio image; however, a JPEG-HDR image decoder can combine the baseline image and the ratio image to decode an HDR image.

As depicted in FIG. 1, a JPEG-HDR image comprises a JPEG Header 110, JPEG-coded data for a baseline image 120, and a set of one or more JPEG application markers 130 defining the characteristics of a ratio image 140. In some embodiments the ratio image may only comprise compressed luminance (e.g., Y) ratio data (140-1), typically stored in logarithmic format. In some other embodiments, a ratio image 140 may also comprise optional chroma (e.g., Cb and Cr) data (140-2). Embodiments of the present invention support either configuration of a JPEG-HDR file format.

HDR Image Decoder

Figure 2:
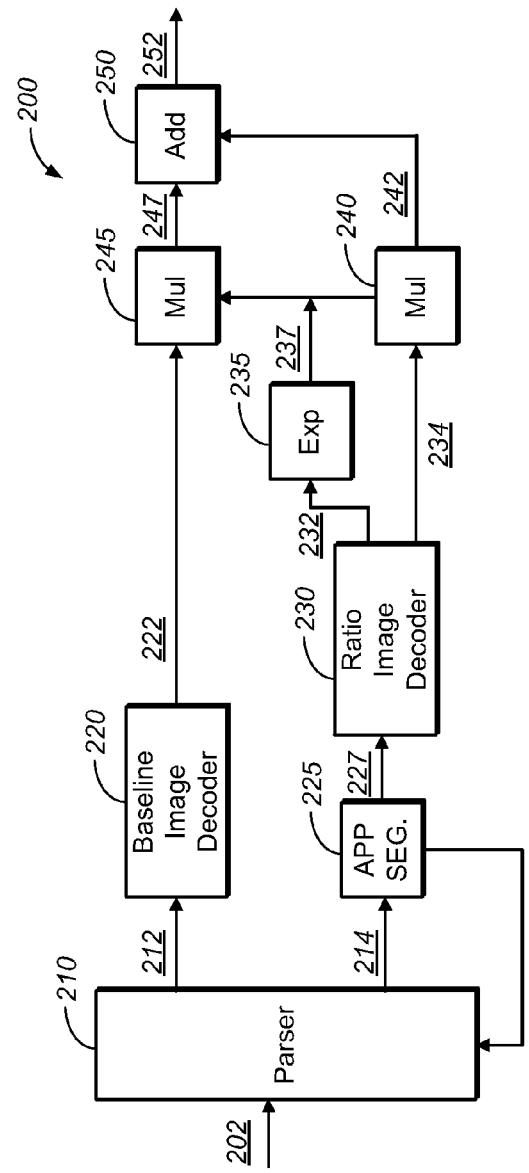
FIG. 2 depicts an example HDR image decoder according to an embodiment of the present invention.

FIG. 2 illustrates an example HDR image decoder, in accordance with some possible embodiments of the present invention. In an example embodiment, the HDR image decoder is implemented by one or more computing devices, and configured with software and/or hardware components that implement image processing techniques for decoding HDR image data (denoted as HDR 202 in FIG. 2) comprising a tone mapped baseline image (e.g., 120) and HDR reconstruction data (e.g., ratio image 140). In an example embodiment, HDR reconstruction data refers to luminance ratio values, Cb and Cr residual values, and parameters and auxiliary data related to the foregoing data. In an example embodiment, the image data to be decoded by the HDR image decoder is in an image file in a JFIF image format (e.g., JPEG-HDR).

The HDR image decoder may comprise a parser 210 configured to receive the HDR image data 202 (e.g., a JPEG-HDR image) and to parse the HDR image data 202 into the baseline image 212 and one or more application markers (e.g., application marker 130) storing the ratio image data 227. In an example embodiment, the parser 210 is a standard JPEG decoder.

The HDR image decoder may also comprise a baseline image decoder 220 and a ratio image decoder 230. In an embodiment, the baseline and the ratio images may be coded as JPEG images, hence the baseline and ratio image decoding may comprise the following sequence of operations: a variable length coder (VLC) decoding, inverse discrete cosine transformations (IDCT), and inverse quantization (IQ) or de-quantization. The output of the ratio image decoder 230 may yield luminance ratio data 232 (coded in logarithmic format) and Chroma residual data 234.

The HDR image decoder may also comprise an inverse logarithm processing block (Exp 235) configured to convert logarithmic luminance ratios 232 into luminance ratios in a linear domain (e.g., 237). The luminance ratios 237 are multiplied with the baseline image data 222 to derive an intermediate HDR image 247. They may also be multiplied with and optional residual chroma data 234 to derive scaled residual data 242. Finally, the intermediate HDR data 247 and the scaled residual data 242 are combined (e.g., added) to produce the decoded HDR data 252.

Some embodiments may also include additional operations on the decoding of baseline and ratio images, such as gamma correction and color transformations.

Image Post-Processing

In most display devices, especially portable displays, the native resolution of a display is typically far smaller than the resolution of a captured HDR image. For example, a 2 Mpixel (MP) image may have a 1632×1224 spatial resolution and an 8 MP image may have a 3264×2448 spatial resolution. In contrast, the display of a typical smartphone may have a 480×800 spatial resolution. Thus, after decoding an image, there is a need for image post-processing so that the whole image or part of an image can be displayed properly on a screen. Such image post-processing operations may include:

Down-scaling, where an image or part of an image is scaled down

Windowing, where only a selected portion of an image is displayed

Up-scaling, where part of the image is scaled up—usually after a windowing operation Sharpening, where an image or part of an image is manipulated (e.g., by using unsharp masking techniques) to look sharper Rotation, where an image or part of an image is rotated Color-related operations, such as brightness and contrast enhancement Given a coded HDR image, such post-processing operations may be performed after the HDR image is fully decoded, e.g., for a JPEG-HDR image, after applying the process depicted in FIG. 2. However, HDR images require more than 8 bits per color component. Thus, storing and post-processing such images may be computationally intensive, especially on mobile devices with limited memory and computational resources. Furthermore, many mobile devices may integrate 8-bit-based hardware accelerators for the fast decoding, post-processing, and display of SDR images (e.g., hardware JPEG decoders). An embodiment of the present invention is to disclose methods that take full advantage of such hardware accelerators when decoding HDR images.

An example embodiment performs post-processing operations separately on the baseline and ratio images of an HDR image, thus reducing the memory and processing requirements. Since baseline and ratio images are typically stored using SDR-like resolutions (e.g., 8-bits per image component), separate post-processing of the baseline and ratio images may also take full advantage of any integrated image processing accelerator engines.

FIG. 3 depicts an example decoding and post-processing process for HDR images according to an embodiment of this invention. A coded HDR image 310 may comprise two or more separate coded sub-images, e.g., a coded (e.g., JPEG-compressed) baseline image and a coded ratio image. Upon receiving a post-processing command, e.g., a command to down-scale the input image so that it can be displayed on a lower-resolution display, in an embodiment, the HDR decoder may decode and post-process its sub-images separately, before combining them again (335) to form an HDR image suitable for display or other post-processing.

These decoding and post processing operations (315, 320, 325, and 330) on the HDR sub-images may depend on a variety of factors, such as the coded format of the input HDR image and the type of post-processing operation to be performed.

In an embodiment, processing efficiencies may be preserved or promoted depending on the post-processing command, with decoding of the coded HDR sub-images in part (e.g., partial decoding), rather than decoding in whole. Partial decoding may be performed either in the spatial domain or a transform domain.

In an example embodiment, the image is received in a JPEG-HDR format, e.g., as depicted in FIG. 1. FIG. 4 depicts an example decoding and post-processing process according to an embodiment wherein in a JPEG-HDR image both the baseline and ratio images may be coded using the JPEG standard. According to the JPEG specification (ISO/IEC 10918-1:1994), an image is coded by dividing it into a plurality of 8×8 pixel-wide, non-overlapping, regions (or blocks), and each 8×8 block is coded with:

Forming a block of DCT (Discrete Cosine Transform) coefficients with application of the 8×8 DCT on the original data block Quantizing these DCT coefficients (e.g., dividing each coefficient with a scale factor)

Further coding the quantized coefficients using a VLC (Variable Length Coder) encoder.

In a JPEG decoder, each coded block is decoded with a process that comprises essentially the inverse of the encoding process, described directly above. For example:

After VLC decoding, a block of 8×8 DCT coefficients is extracted

After inverse quantization (e.g., multiplying each DCT coefficient with a scale factor), a set of un-quantized DCT coefficients is derived After applying an 8×8 inverse DCT (IDCT), an approximation of the original 8×8 pixel data is extracted In an example embodiment, the post-processing command comprises a command to down-scale the HDR image, e.g., by a factor of two. For JPEG-coded images, an alternative way to downscale the image by a factor of two comprises decoding the top left 4×4 block of DCT coefficients in each received 8×8 block (e.g., and leaving the remaining 4×4 blocks undecoded). Thus, an embodiment of partial decoding of the baseline and ratio images according to a post-processing command (e.g., steps 315 and 325), wherein the command is to downscale the decoded image by a factor of two, may comprise the following steps:

For each 8×8 block:
    Perform VLC decoding to extract 8×8 DCT coefficients
    Perform partial inverse quantization (e.g., dequantize the top left 4×4 block of the DCT coefficients)
    Perform a 4×4 IDCT on the de-quantized 4×4 DCT block
    Combine 4×4 blocks to provide down-scaled by 2 baseline and ratio images If no additional post-processing (e.g., steps 420 and 430) is required on the two sub-images, then the two images may be combined and sent for display. Otherwise, additional post-processing may be performed as may be beneficial.

A similar approach may also be followed when downscaling by a factor of 4, except that the baseline and ratio image decoders need only perform an IDCT on the top left 2×2 DCT coefficients of each block.

Some embodiments may also implement alternative up-scaling and down-scaling processing techniques in the compressed domain, such as those described by R. Dugad and N. Ahuja, in "*A fast scheme for image size change in the compressed domain,*" in IEEE Trans. on Circuits and Systems for Video Technology, Vol. 11, No. 4, April 2001, pp. 461-474, which is incorporated herein by reference.

In an embodiment, wherein the down-scaling scaling factor is not simply a multiple of 2, 4, or 8, a downscaling by 8, 4 or by 2 operation in the DCT domain may be followed by another up-scaling or down-scaling operation of the decoded baseline and ratio images using traditional spatial domain image processing techniques. For example, since 6=2×3, down-scaling by a factor of 6 may be performed by (a) down-scaling by a factor of 2 in the DCT domain (e.g., steps 415 and 425), followed by downscaling by a factor of 3 in the spatial domain (e.g., steps 420 and 430).

In another embodiment, the process that is described with reference to FIG. 3 is applied to an image windowing operation. In this example embodiment, a portion of the original HDR image 310 is displayed, instead of displaying the entire image. As a portion of the decoded HDR image will be displayed, computational and memory costs are relatively low (e.g., in relation to costs associated with displaying the entire HDR image). Thus, a decoder may perform a partial decoding of the HDR sub-images in the spatial domain. Decoding a JPEG-HDR image according to an embodiment may thus comprise the following steps on each of the baseline and ratio images:

Perform VLC decoding to extract the coded 8×8 blocks
    Perform partial decoding, by applying inverse quantization and IDCT to the coded 8×8 blocks to be visible after windowing
    Scale the windowed baseline and ratio images as appropriate
    Combine the scaled baseline and ratio images to create a windowed HDR image
    Display the windowed HDR image The methods described herein for decoding and post-processing JPEG-HDR images can easily be extended to other HDR image formats that may encapsulate an HDR image using two or more SDR-like sub-images. Such formats may be based in other still-image and video coding formats, including the family of MPEG (Motion Picture Experts Group) video coding standards (e.g., MPEG-1, MPEG-2, and MPEG-4), the JPEG2000 coding standard, and others.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the decoding, image post-processing, and display of HDR images, such as those described herein. The computer and/or IC may compute any of a variety of parameters or values that relate to guided image up-sampling as described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement HDR image processing methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient decoding and image processing of HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to combine decoding and post-processing of a coded HDR image with a processor, the method comprising:
   accessing the coded HDR (high dynamic range) image, the HDR image comprising a JPEG-coded baseline image and a second coded image, wherein the JPEG-coded baseline image comprises a plurality of 8×8 coded baseline image blocks and the second coded image comprises a plurality of coded regions;
   partially decoding the JPEG-coded baseline image according to a post-processing command for the HDR image to output a first decoded image, wherein the partial decoding of the first coded image comprises:
   performing an N×N IDCT (Inverse Discrete Cosine Transform) on each one of the plurality of the coded 8×8 baseline blocks, where N is a positive integer smaller than 8 but larger or equal to 1;
   partially decoding the second coded image according to the post-processing command to output a second decoded image; and
   combining the first decoded image and the second decoded image to output a decoded and post-processed HDR image.

2. The method of claim 1, wherein the post-processing command comprises at least one of an image down-scaling command, an image up-scaling command, and an image windowing command.

3. The method of claim 1, wherein the second coded image comprises a JPEG-coded ratio image comprising a plurality of coded ratio image blocks.

4. The method of claim 3, wherein decoding the JPEG-coded ratio image comprises performing an N×N IDCT on each one of the plurality of the coded ratio blocks, where N comprises a positive integer smaller than 8 but larger or equal to 1.

5. The method of claim 4, wherein N has a value that is equal to 1, 2, or 4.

6. The method of claim 1, wherein N has a value that is equal to 1, 2, or 4.

7. The method of claim 1, further comprising:
   before the combining step, applying second post-processing to the first decoded image according to the post-processing command to generate a post-processed first decoded image, wherein the combining step comprises combining the post-processed first decoded image and the second decoded image.

8. The method of claim 1, further comprising:
   before the combining step, applying third post-processing to the second decoded image according to the post-processing command to generate a post-processed second decoded image, wherein the combining step comprises combining the post-processed second decoded image and the first decoded image.

9. The method of claim 1, further comprising:
   before the combining step, applying second post-processing to the first decoded image according to the post-processing command to generate a post-processed first decoded image; and
   applying third post-processing to the second decoded image according to the post-processing command to generate a post-processed second decoded image, wherein the combining step comprises combining the post-processed first decoded image and the post-processed second decoded image.

10. A non-transitory computer-readable storage medium having stored thereon computer-executable instructions for executing a method with a processor according to the method of claim 1.

11. A method to decode a coded HDR image with a processor, the method comprising:
   accessing the coded HDR (high dynamic range) image comprising a JPEG-coded baseline image and a coded ratio image, wherein the JPEG-coded baseline image comprises a first plurality of 8×8 coded baseline image blocks, and the coded ratio image comprises a second plurality of coded ratio image blocks;
   decoding the JPEG-coded baseline image according to a post-processing command to output a first decoded image, wherein decoding the JPEG-coded baseline image comprises performing an N×N IDCT (Inverse Discrete Cosine Transform) on each one of the plurality of the coded 8×8 baseline blocks, where N is a positive integer smaller than 8 but larger or equal to 1;
   decoding the coded ratio image according to the post-processing command to output a second decoded image; and
   combining the first decoded image and the second image to output a decoded and post-processed HDR image.

12. A method to decode a coded HDR image with a processor, the method comprising:
   accessing the coded HDR (high dynamic range) image comprising a JPEG-coded baseline image and a coded ratio image, wherein the JPEG-coded baseline image comprises a first plurality of 8×8 coded baseline image blocks, and the coded ratio image comprises a second plurality of coded ratio image blocks;
   decoding the JPEG-coded baseline image according to a post-processing command to output a first decoded image;
   decoding the coded ratio image according to the post-processing command to output a second decoded image, wherein decoding the coded ratio image comprises performing an N×N IDCT on each one of the plurality of the coded ratio blocks, where N comprises a positive integer smaller than 8 but larger or equal to 1; and
   combining the first decoded image and the second image to output a decoded and post-processed HDR image.

13. The method of claim 11, wherein N has a value that is equal to 1, 2, or 4.

14. The method of claim 12, wherein N has a value that is equal to 1, 2, or 4.

* * * * *